(12) United States Patent
Mills et al.

(10) Patent No.: US 8,851,740 B1
(45) Date of Patent: Oct. 7, 2014

(54) LIQUID LEVEL DETECTION AND AUTONOMOUS CALIBRATION FOR SELF-SERVE BLENDING APPARATUS AND METHODS

(75) Inventors: Christian D. Mills, Highland, UT (US); Gregory D. Jackson, Bountiful, UT (US)

(73) Assignee: K-Tec, Inc., Orem, UT (US)

( * ) Notice: Subject to any disclaimer, the term of this patent is extended or adjusted under 35 U.S.C. 154(b) by 1031 days.

(21) Appl. No.: 12/903,115

(22) Filed: Oct. 12, 2010

(51) Int. Cl.
*B01F 15/02* (2006.01)

(52) U.S. Cl.
USPC ............ 366/153.1; 366/314; 222/52; 222/64; 222/132

(58) Field of Classification Search
USPC ..................... 366/153.1, 314; 222/52, 64, 132
See application file for complete search history.

(56) References Cited

U.S. PATENT DOCUMENTS

| | | | | |
|---|---|---|---|---|
| 4,362,033 A | * | 12/1982 | Young | 68/207 |
| 5,655,834 A | * | 8/1997 | Dickson | 366/205 |
| 7,539,593 B2 | * | 5/2009 | Machacek | 702/127 |

* cited by examiner

*Primary Examiner* — David Sorkin
(74) *Attorney, Agent, or Firm* — Holland & Hart

(57) ABSTRACT

A self-serve drink blending device includes a blend chamber, at least one product source, a water source, an ice source, a liquid level sensor, a controller and a dispenser. The blend chamber includes a blending blade. The at least one product source is configured to deliver a volume of product to the blend chamber. The water source is configured to deliver a volume of water to the blend chamber. The ice source is configured to deliver a volume of ice to the blend chamber. The liquid level sensor is mounted to the blend chamber and configured to create a liquid level signal when contents in the blend chamber reach a predetermined level. The controller is configured to automatically calibrate the at least one product source, the water source, and the ice source based on the liquid level signal. The dispenser is arranged to dispense contents from the blend chamber.

8 Claims, 13 Drawing Sheets

LIQUID LEVEL DETECTION AND AUTONOMOUS CALIBRATION FOR SELF-SERVE BLENDING APPARATUS AND METHODS

TECHNICAL FIELD

This invention relates to blending devices, and more particularly to calibration systems and methods for self-serve blending apparatuses.

BACKGROUND

Food processors and blending devices have existed for many years. One example of a blending device is shown and described in U.S. Pat. No. 5,655,834, which is incorporated in its entirety by this reference.

Food processors and blending machines are being used now more than ever, particularly in the high-volume, commercial beverage industry. People are increasingly becoming aware of the benefits, in terms of taste and quality, of well-processed beverages. Blended fruit smoothies and similar fruit drinks, popular with all types of people ranging from the fitness conscious to the less active, require a food processor or blending machine. Cold beverages, in particular, which utilize fruit (frozen or fresh) and ice to prepare present unique challenges in beverage preparation. An appropriate blending machine will break down the ice, fruit, and other ingredients in attempting to achieve an ideal uniform drink consistency. In addition, food processors or blending machines are ideal for blending nutritional supplements into beverages while similarly attempting to achieve an ideal uniform drink consistency.

In addition to the recent increase in the popularity of smoothies, food processors and blending machines are being used to produce many new and different beverages. For example, different types of coffees, shakes, dairy drinks, and the like are now commonly served at many different types of retail business locations. Consumers are demanding more diversity and variety in the beverages available. Some keys to consistently producing a high quality beverage, irrespective of the specific type of beverage, are quality ingredients, accurate quantity measurement of the ingredients, and a high quality blending machine that will quickly and efficiently blend the ingredients to produce a drink with uniform consistency.

SUMMARY

One aspect of the present disclosure relates to a self-serve drink blending device that includes a blend chamber, at least one product source, a water source, an ice source, a liquid level sensor, a controller, and a dispenser. The blend chamber includes a blending blade. The at least one product source is configured to deliver a volume of product to the blend chamber. The water source is configured to deliver a volume of water to the blend chamber. The ice source is configured to deliver a volume of ice to the blend chamber. The liquid level sensor is mounted to the blend chamber and configured to create a liquid level signal when contents in the blend chamber reach a predetermined level. The controller is configured to automatically calibrate the at least one product source, the water source, and the ice source based on the liquid level signal. The dispenser is arranged to dispense contents from the blend chamber.

The liquid level sensor may include a capacitive sensor. The liquid level sensor may be mounted to an exterior surface of the blend chamber. The capacitive sensor may include a pad having at least two conductive traces separated by an insulator. The liquid level sensor may include first and second metallic probes exposed within the blend chamber. The at least one product source may include a plurality of different product sources each configured to deliver a volume of product into the blend chamber. The ice source may include an ice making device and an ice metering device. Each of the at least one product sources may include a pump, and the water source may include a valve or a pump, wherein the controller is configured to turn OFF the pump or valve of the water source in response to the liquid level signal.

Another aspect of the present disclosure relates to a method of calibrating a self-serve drink blending device. The method includes providing a drink blending device having a blend chamber, at least one product source, a water source, and a liquid level sensor associated with the blend chamber. The method also includes operating the water source to fill the blend chamber with water until a liquid level is sensed with the liquid level sensor, determining a fluid flow rate of water into the blend chamber based on a pulse count required to reach the liquid level with water, and emptying the water from the blend chamber. The method also includes operating the at least one product source to fill the blend chamber with a first product for a predetermined product flow time, operating the water source to deliver water into the blend chamber to mix with the first product until the liquid level is sensed with the liquid level sensor, and determining a fluid flow rate of the first product into the blend chamber based on the product flow time and a water pulse count required to sense the liquid level of mixed water and the first product with the liquid level sensor.

The liquid level sensor may be a capacitive sensor, and determining the liquid level includes generating a signal when a capacitive level in the capacitive sensor exceeds a threshold level. The method may further include emptying the mixed water and first product from the blend chamber, operating the at least one product source to fill the blend chamber with a second product for a predetermined time period, operating the water source to deliver water into the blend chamber to mix with the second product until the liquid level is sensed with the liquid level sensor, and determining a fluid flow rate of the second product into the blend chamber. The method may include shutting OFF operation of the water source when the liquid level of water alone, the mixed water and first product, or the mixed water and second product is sensed with the liquid level sensor. The at least one product source may include a product or an ice source.

Another aspect of the present disclosure relates to a method of calibrating a self-serve drink blending device. The method includes providing a drink blending device having a blend chamber, at least one product source, a water source, an ice source, and a liquid level sensor associated with the blend chamber, determining a water flow rate from the water source into the blend chamber using signals from the liquid level sensor, determining a product flow rate of a first product from the at least one product source into the blend chamber using signals from the liquid level sensor and the determined flow rate of water, and determining an ice dispense rate from the ice source into the blend chamber using signals from the liquid level sensor and the determined water flow rate.

Determining the water flow rate may include measuring an amount of flow meter pulses required to deliver water into the blend chamber until the liquid level sensor detects a fluid level in the blend chamber and generates a signal. Determining the product flow rate may include operating the at least one product source for a predetermined amount of time to deliver the first product into the blend chamber, and measuring a volume of water delivered into the blend chamber to mix with the first product until the liquid level sensor detects a fluid level in the blend chamber and generates a signal. Determining the ice dispense rate may include operating the ice source for a predetermined amount of time to deliver ice into the blend chamber, and measuring a volume of water delivered into the blend chamber to mix with the ice until the liquid level sensor detects a liquid level in the blend chamber and generates a signal.

The method may further include automating the steps of determining the water flow rate, determining the product flow rate, and determining the ice dispense rate to occur sequentially. The method may include emptying the blend chamber and repeating the steps of determining the product flow rate. The method may include emptying the blend chamber after each of the steps of determining the water flow rate, determining the product flow rate, and determining the ice dispense rate.

The foregoing and other features, utilities and advantages of the invention will become apparent from the following detailed description of the invention with reference to the accompanying drawings.

DETAILED DESCRIPTION

The present disclosure is directed to a self-serve blending machine, a blending assembly of the machine, control and calibration systems of the machine, and related systems and methods. One aspect of the self-serve blending machine relates to calibration of the various inputs (i.e., water, products, and ice) into the blending assembly. Another aspect relates to automated calibration of the water and at least one of the product, and ice inputs into the blending assembly. A further aspect relates to a calibration sequence, which when initiated automatically calibrates each of the water, products, and ice inputs to the blending assembly. Regular, periodic calibration of the inputs into the blending assembly may, for example, improve consistency in the blended product.

Calibration of the inputs to the blending assembly typically includes determining an amount of the water, product, or ice inputs (i.e., the contents) delivered into a blend chamber of the blending assembly. One way to determine a liquid level within the blend chamber is to use a capacitive sensor. Capacitive sense technology is used in many applications including touch pads, switches, buttons, touch screens, and proximity sensing. A capacitive sensor typically consists of an electrically conductive material (e.g., a pad or wire) connected via a wire or printed circuit board (PCB) trace to a microcontroller. The microcontroller measures and monitors the capacitance on the pad. As another conductive material approaches the pad, the capacitance of the pad changes, which triggers the microcontroller to start another process (e.g., send a signal to stop delivery of the input into the blend chamber, illumination of a light, or sounding of an audible signal).

Since most liquids are conductive, capacitive sense technology may be used to detect when a liquid is present in a container. The liquid level detection aspects of the present disclosure are designed to detect a content level (e.g., liquid level) within a blend chamber of the blending assembly of a self-serve blending machine. A liquid level signal is determined using, for example, the capacitive sense technology discussed above, and may be used with other parameters such as the amount of time used to reach the liquid level, the density or other physical properties of the input (i.e., water, product, or ice) and other factors to determine a dispense rate of the input into the blending assembly. Once the dispense rate is determined, the dispense rate may be used by the self-serve blending machine to control the amount of a particular input into the blending assembly used to create a blended product.

Figure 1:
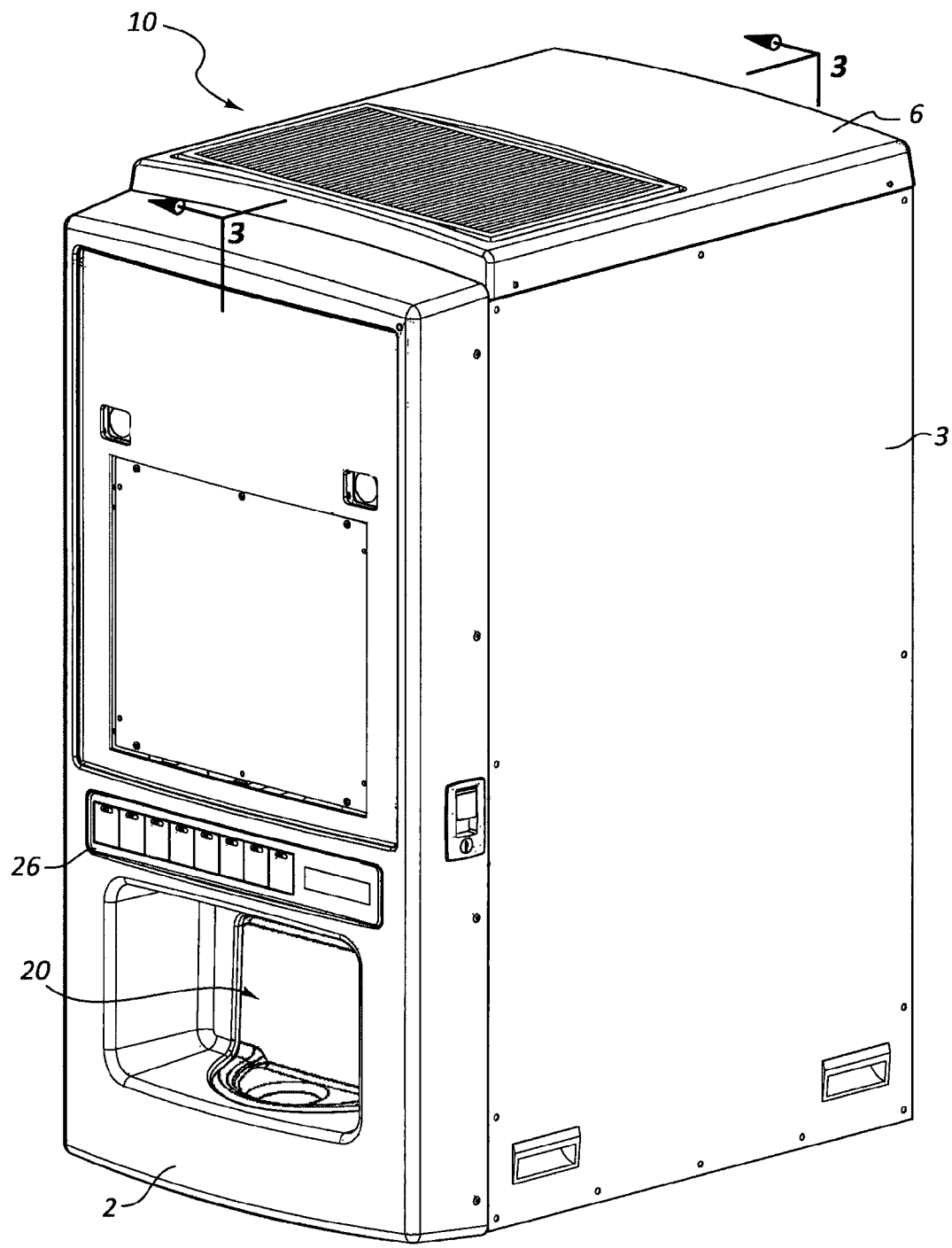
FIG. 1 is a perspective view of an example self-serve blending machine in accordance with the present disclosure.
Figure 2:
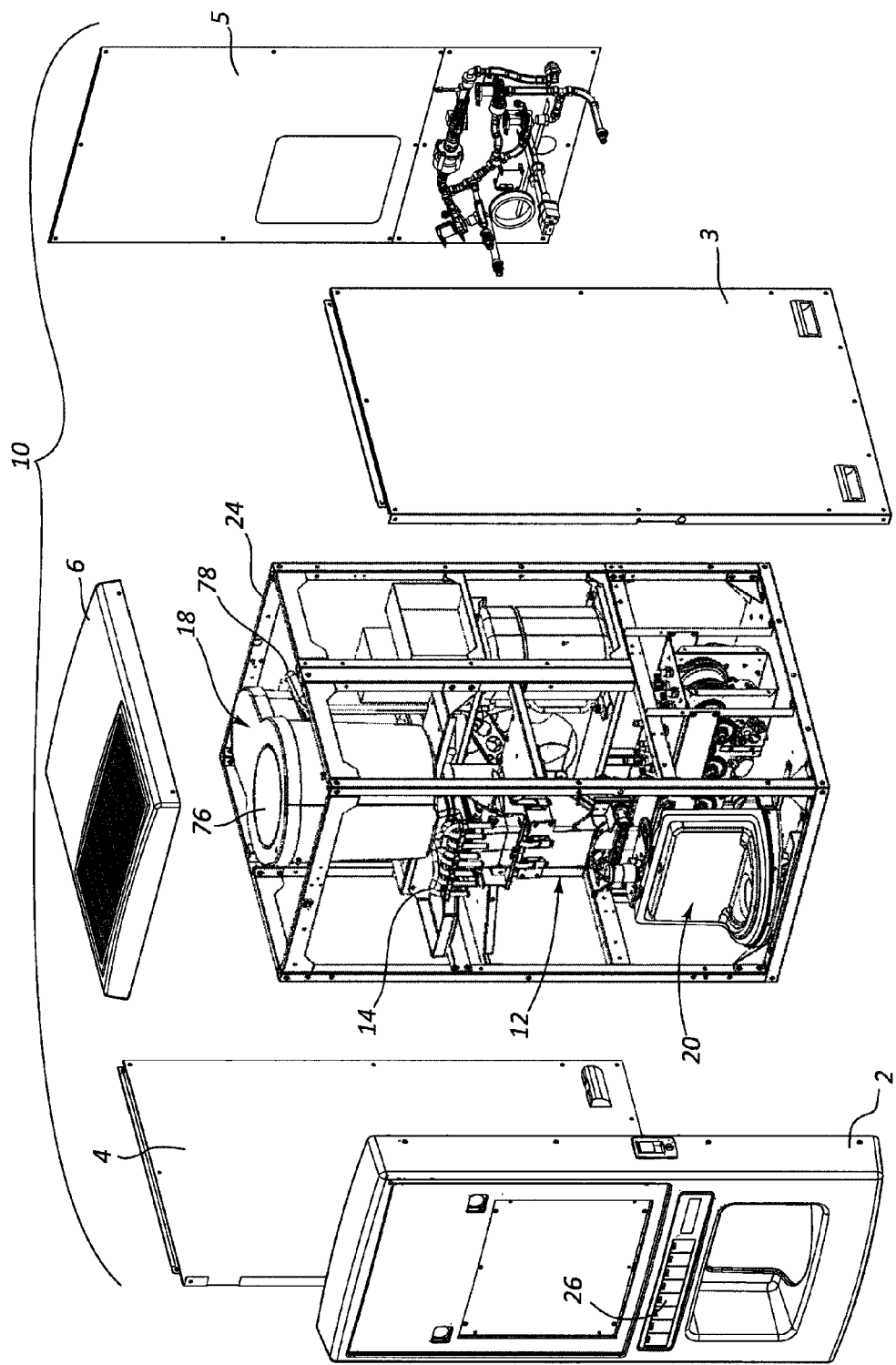
FIG. 2 is an exploded perspective view of the self-serve blending machine of FIG. 1.
Figure 3:
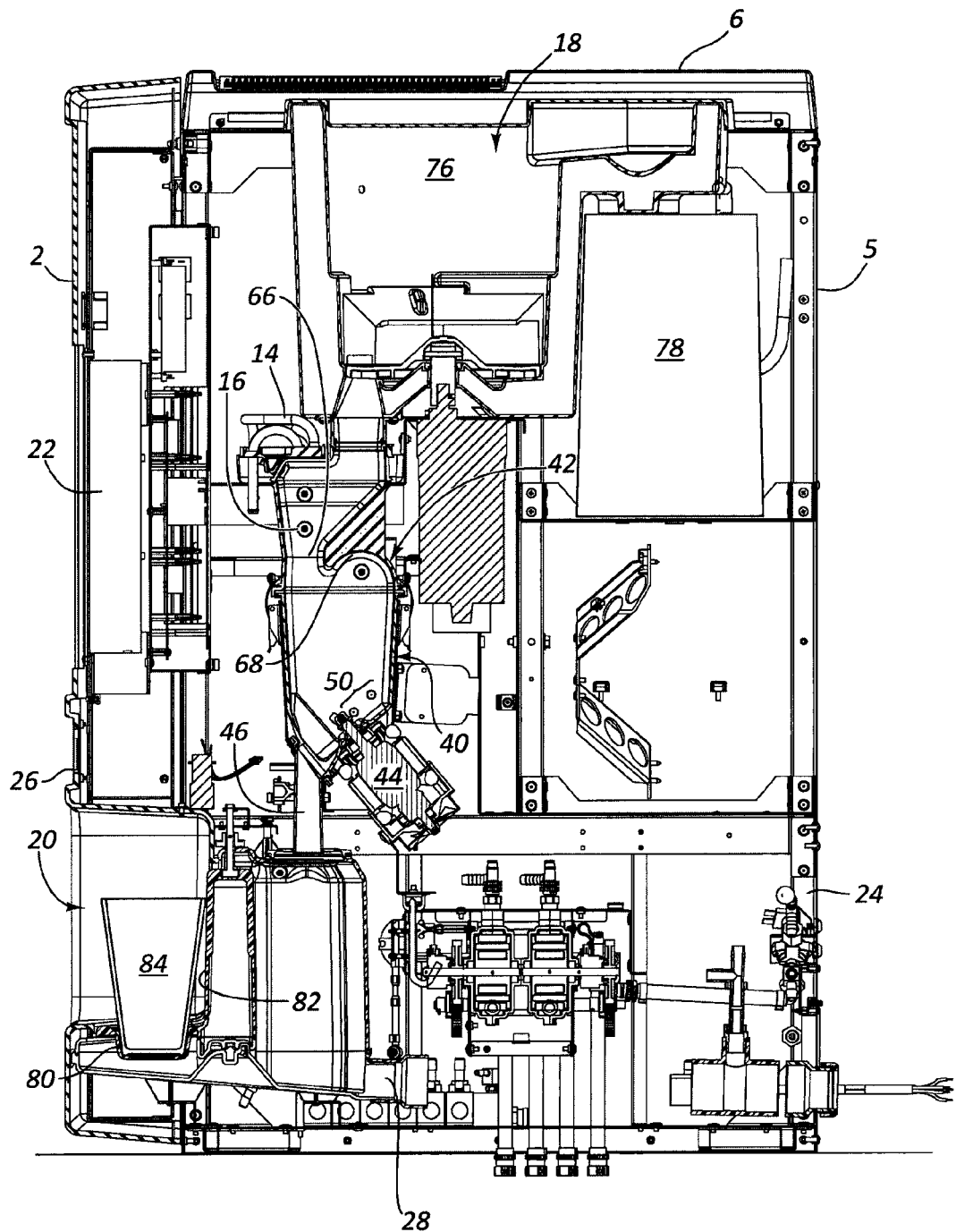
FIG. 3 is a cross-sectional view of the self-serve blending machine of FIG. 1 taken along cross-section indicators 3-3.
Figure 4:
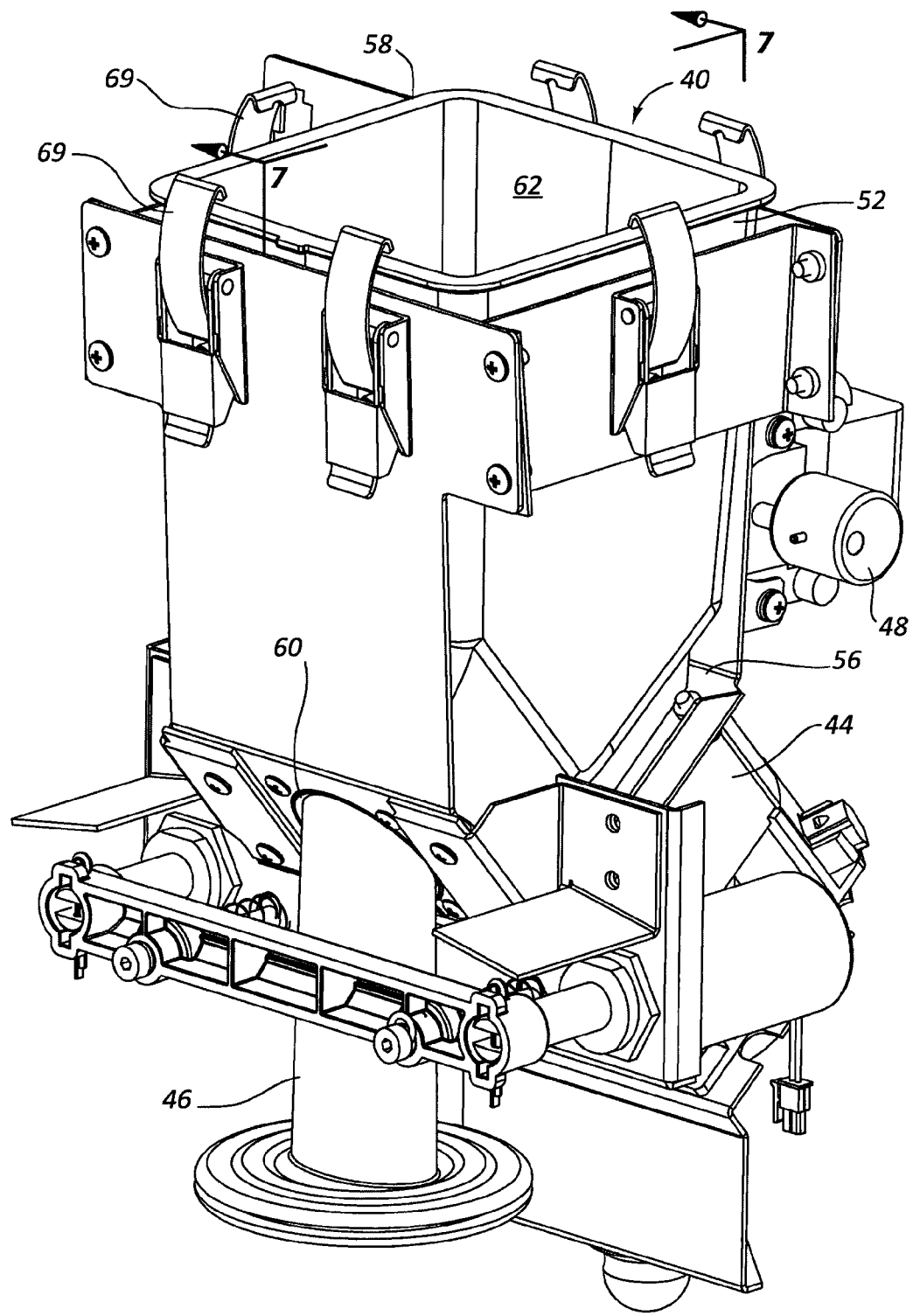
FIG. 4 is a perspective view of a blending assembly of the self-serve blending machine of FIG. 1.
Figure 5:
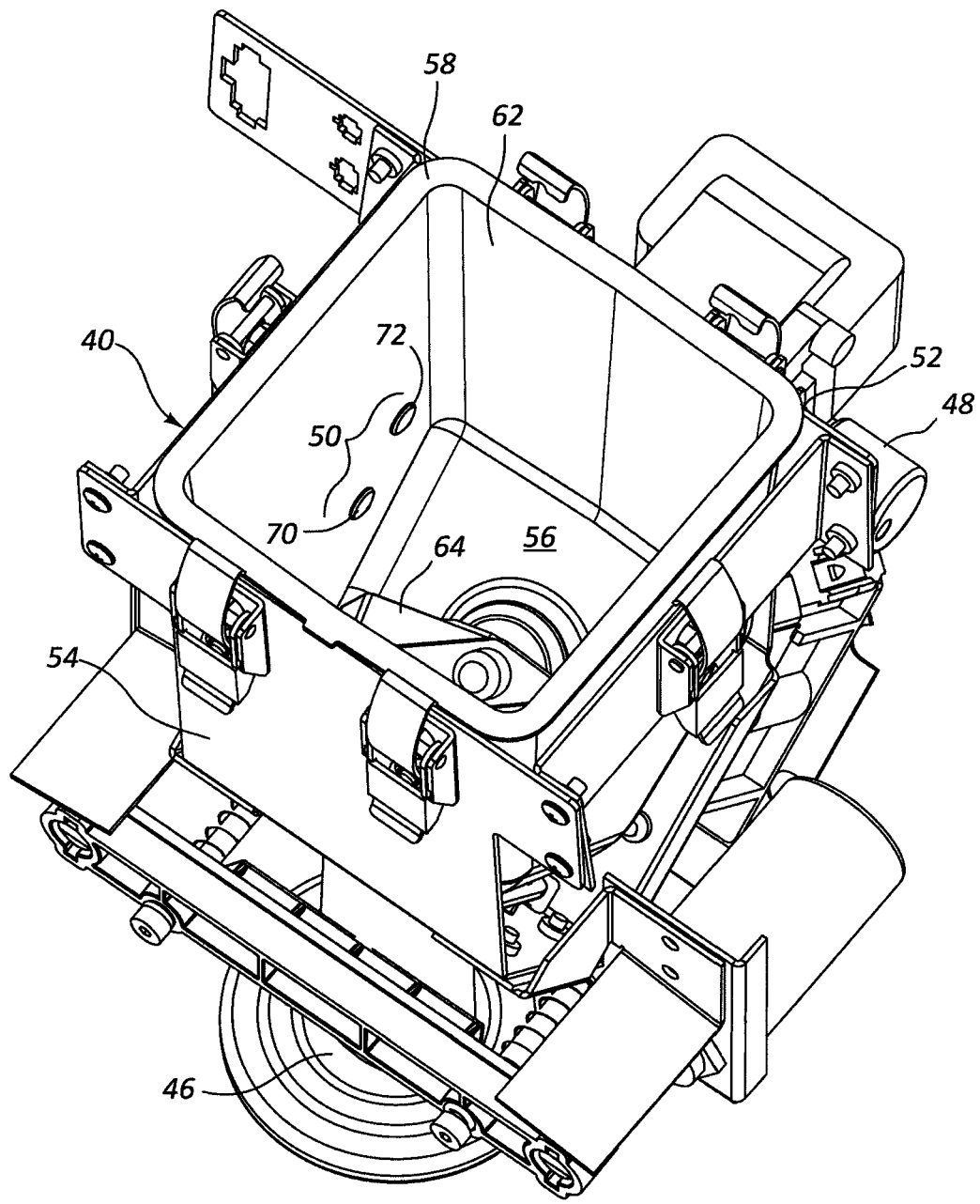
FIG. 5 is a top perspective view of the blending assembly of FIG. 4.

Referring now to FIGS. 1-3, a self-serve blending machine 10 is shown and described. The self-serve blending machine 10 includes a blending assembly 12, a product source 14, a water source 16, an ice source 18, a dispense station 20, a controller 22, a frame 24, a user interface 26, and a drain 28. The self-serve blending machine 10 may be configured to minimize the amount of manual input to provide a blended product at the dispense station 20. The user may select from a plurality of blended product options at the user interface 26. The controller 22 operates features of the self-serve blending machine 10 to dispense a plurality of inputs selected from the product, water and ice sources 14, 16, 18 into the blending assembly 12 where the blended product is created. The product source 14 may include a plurality of product sources that provide a plurality of products to the blending assembly 12. The blended product is then dispensed into a container (e.g., cup) that is presented to the user at the dispense station 20. The self-serve blending machine 10 may be operable to self-clean the blending assembly 12 automatically and be ready to produce another blended product in accordance with the selections of a user at the user interface 26.

Referring now to FIGS. 2-7, the blending assembly 12 includes a blend chamber 40, an upper blend chamber 42, a motor 44, a spout 46, an agitator 48, and a sensor assembly 50. Example blending assemblies for use with the example self-serve blending machines disclosed herein are described in U.S. patent application Ser. No. 11/675,522 entitled "Blending Apparatus With Non-Vertical Axis of Rotation," which application is incorporated herein in its entirety by this reference.

The blend chamber 40 includes a top end 52, a bottom end 54, a bottom wall 56, a top opening 58, an outlet opening 60, a cavity 62, and a blending blade 64. An axis of rotation X of blending blade 64 may be slanted at an angle θ from a vertical direction Z (see FIG. 7). According to some embodiments, an optimal range for angle θ is about 25 degrees to about 65 degrees, and more preferably about 35 degrees to about 45 degrees. The bottom wall 56 is typically arranged perpendicular to the axis X. A slope for the bottom wall (i.e., rise over run) is typically in the range of about 0.6 to about 1.1, and preferably about 0.7 to about 1.0.

The outlet opening 60 is typically defined at the bottom end 54. The outlet opening 60 may be at least partially defined within the bottom wall 56. A portion of the outlet opening 60 may be defined at least in part by a side wall 55 of the blend chamber 40 (see FIG. 7).

The upper blend chamber 42 is positioned at the top end 52 of the blend chamber 40. The upper blend chamber 42 may include a deflector surface 68 configured to deflect the contents within the blend chamber 40. The upper blend chamber 42 may include an inlet opening 66 into which the inputs from product, water, and ice sources 14, 16, 18 may be input into the blend chamber 40. The upper blend chamber 42 may be secured to the blend chamber 40 with a fastener such as one or more releasable brackets 69 (see FIG. 4).

In various embodiments, deflector surface 68 may be planar, triangular, or any other suitable size, shape or configuration. The combination of deflector surface 68, the sloped bottom wall 56, and the tilted axis X for the blending blade 64 may result in hydrodynamic flow patterns that provide more efficient and effective blending.

The motor 44 may be attached to blend chamber 40. According to various embodiments, motor 44 may be integrally incorporated into the blend chamber 40. In other words, motor 44 may be permanently attached to blend chamber 40. According to some embodiments, motor 44 may be tilted at the same angle θ as the axis of rotation X.

After the contents held within blend chamber 40 have been blended with the blending blade 64, the blended product may be released from blend chamber 40 through outlet opening 60. The arrangement of outlet opening 60 at the bottom end 54 of the blend chamber 40 permits gravity to force the blended product out through the outlet opening 60 and through the spout 46 into a cup 84 positioned within an alcove 82 and supported on a cup holder 80 (see FIG. 3). In some arrangements, the blending blade 64 may continue to turn while the outlet opening 60 is open to help force the blended product to exit into the spout 46. The spinning motion of the blending blade 64 in combination with the agitator 48 and gravity forces present may provide quick and efficient evacuation of the blended product from the blend chamber 40.

Referring again to FIG. 3, the self-serve blending machine 10 may include the product, water and ice sources 14, 16, 18 arranged to deliver inputs (e.g., products, water, and ice) into the blend chamber 40 through the inlet opening 66 of the upper blend chamber 42. The product source 14 may include a plurality of dispense tubes that each carry a different product such as, for example, flavoring, juice, and/or any other product. The water source 16 may be configured with a similar dispense tube construction as is used for the product source 14.

The ice source 18 may be operable to both generate and store ice product and have similar features and functionality as disclosed in U.S. patent application Ser. No. 12/902,050, entitled "Ice Dispensing and Metering System and Methods," and filed on 11 Oct. 2010, which co-pending application is incorporated herein in its entirety by this reference. The ice source includes a hopper 76 that stores a supply of ice produced by the ice generator 78. Ice is dispensed from the hopper 76 into the blend chamber 40.

The agitator 48 may be attached to the bottom end 54 of the blend chamber 40. The agitator 48 may shake or vibrate the blend chamber 40 to facilitate efficient and thorough dispensing of the blended product.

The self-serve blending machine 10 may include a front panel 2, first and second side panels 3, 4, a rear panel 5, and a top panel 6 that are mounted to the frame 24. The front panel 2 may be connected to the frame 24 with a hinge connection that promotes easy opening of the front panel 2 to access the interior components of the self-serve blending machine 10. In at least one example, the controller 22 is exposed for access by an operator upon opening the front panel 2.

In operation, the user may place a cup on a (e.g., rotating or moving) cup holder 80. The user then presses one or more of the buttons at the user interface 26 to select a desired blended product. The cup holder 80 rotates to hold cup 84 under spout 46 (see FIG. 3). The cup holder 80 may manually or automatically move the cup 84 from a user accessible position outside of the front panel 2 to a dispensing position within the alcove 82. The controller 22 may then operate the features of the self-serve blending machine 10 to dispense products, water and ice into the blend chamber 40 from the product, water and ice sources 14, 16, 18. The blending assembly 12 then operates to create the blended product within the blend chamber 40, and the blended product is dispensed through the spout 46 into the cup 84. After the blended product is dispensed, the cup holder 80 moves the cup 84 into a position where the user can remove the cup 84.

A self-cleaning cycle may be programmed to run after the self-serve blending machine 10 dispenses the blended product. The self-cleaning cycle may include dispensing water and/or a cleaning solution into the blend chamber 40. The blending blade 64 may operate to run a blending cycle that causes the water and/or cleaning solution to wash the inside of the blend chamber 40. After the blending cycle is finished, the water and/or cleaning solution may be flushed out through the spout 46 and into the drain 28. The blending blade 64 may be run additionally to rinse and/or run further cleaning and/or sanitation solutions through the blend chamber 40 as part of the cleaning process.

Figure 6:
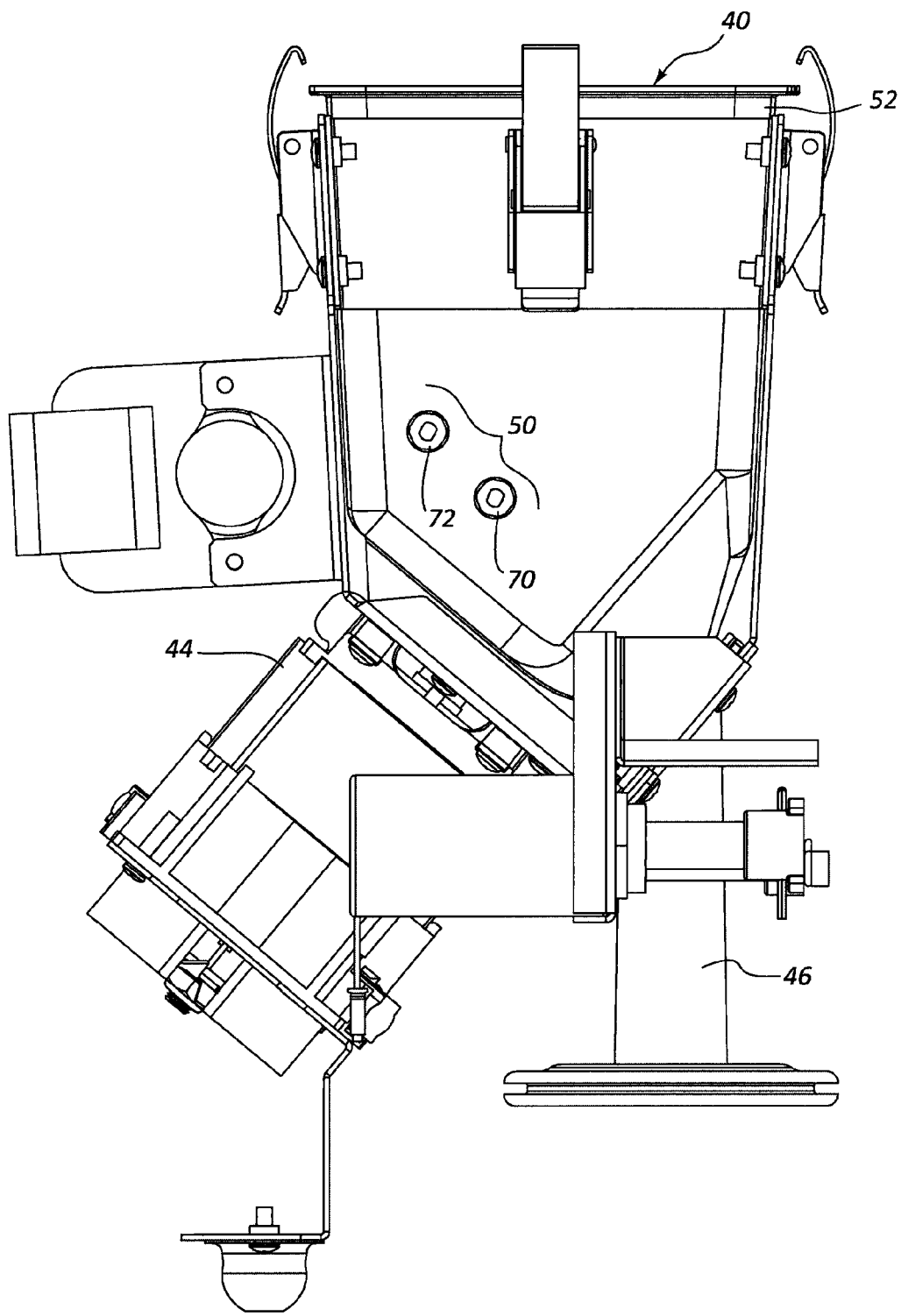
FIG. 6 is side view of the blending assembly of FIG. 4.
Figure 7:
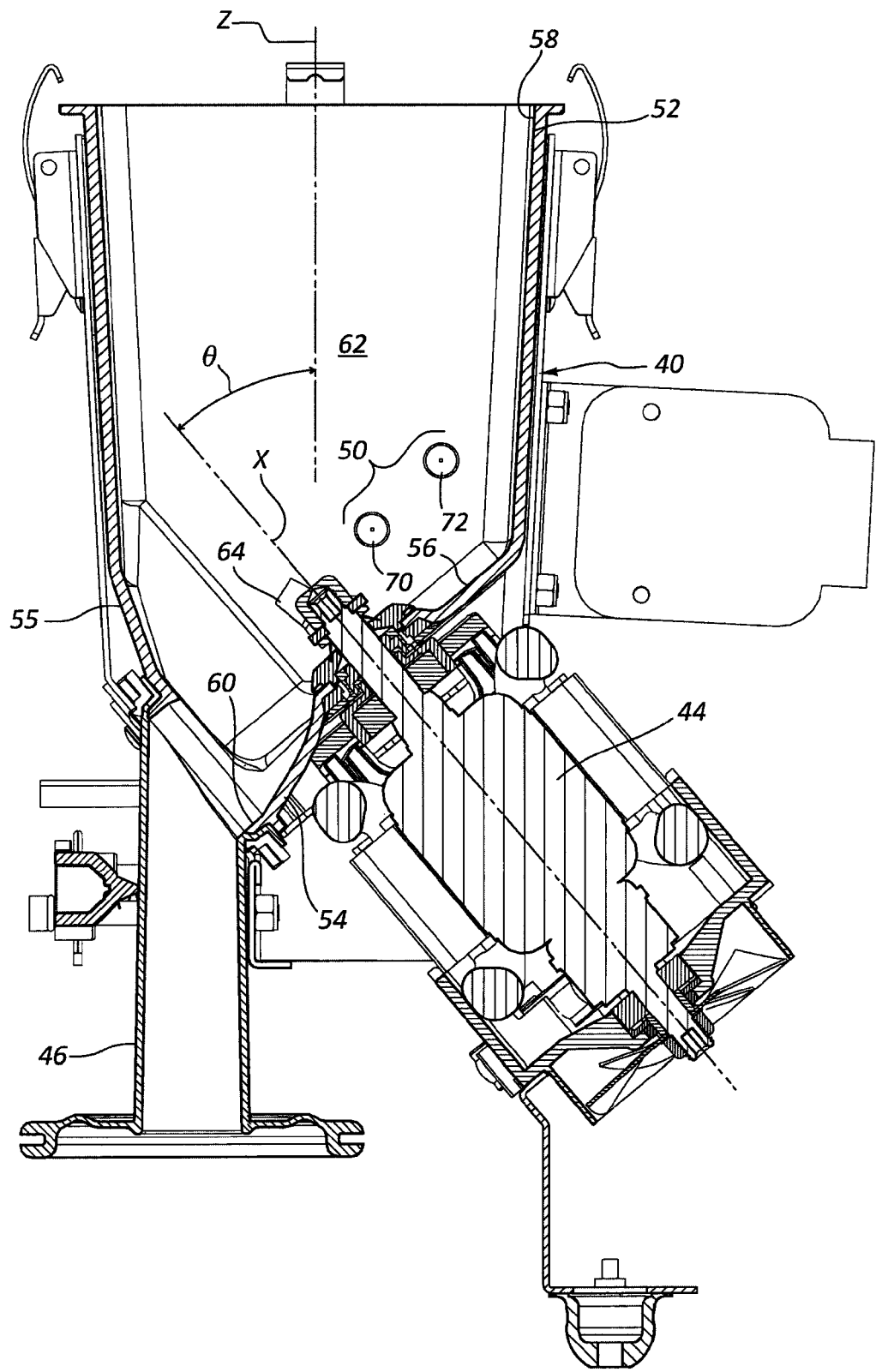
FIG. 7 is a cross-sectional view of the blending assembly of FIG. 4 taken along cross-section indicators 7-7.

Referring now to FIGS. 6 and 7, the liquid level sensor assembly 50 includes a ground probe 70 and a sensing probe 72. The ground and sensing probes 70, 72 may extend through the wall of the blend chamber 40 to be exposed within the cavity 62. The sensing probe 72 may be connected to an analog-to-digital (A/D) sensor input to the controller 22. The sensing probe 72 may be positioned further towards a back wall of the blend chamber 40 spaced further from the outlet opening 60. In at least one example, the sensing probe 72 is positioned to measure content within the blend chamber 40 of about 12 oz. (355 ml).

The ground probe 70 may be spaced lower than the sensing probe 72 and at an angle (e.g., about a 45 degree angle) toward the outlet opening 60. The ground probe 70 may be connected to DC ground.

During calibration of the self-serve blending machine 10, the content level within blend chamber 40 rises and makes contact with the ground and sensing probes 70, 72. This connection draws the voltage level of the sensing probe 72 closer to ground level. When this voltage drops below a determined threshold voltage level, the controller 22 stops dispensing the input (e.g., water, product, or ice) into the blend chamber 40.

The sensing probe 72 may continually calibrate as long as the system is not performing calibration of the product, water, or ice source 14, 16, 18. Calibration of the sensing probe 72 may be done by collecting the A/D samples as they are received by the controller 22 and averaging them periodically (e.g., every 50 ms) on the same periodic interval. The new average A/D is averaged in a window of data (e.g., a 1 second window). In one example, samples are averaged in every 1 second window.

Figure 13:
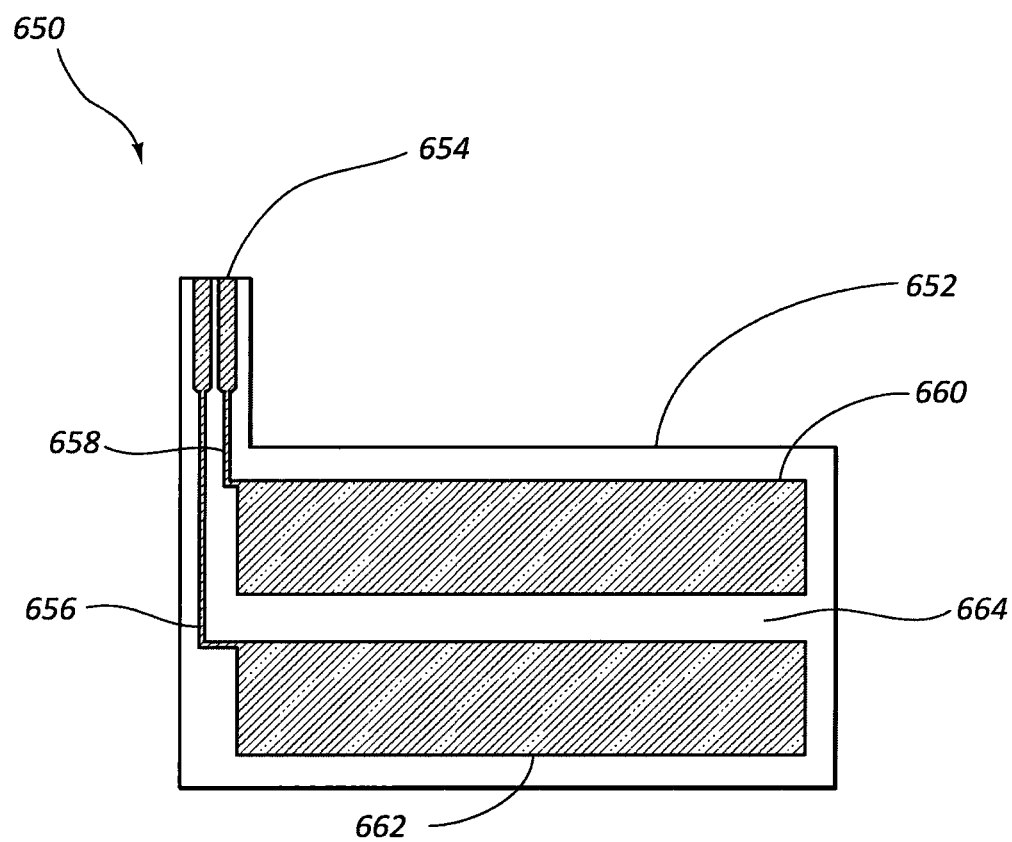
FIG. 13 is a diagram of an example sensor assembly for use with the blending assembly of FIG. 4.

Referring now to FIG. 13, an alternative sensor assembly 650 may be used in place of the liquid level sensor assembly 50. The liquid level sensor assembly 650 includes a base 652, a tail termination or connector 654, a plurality of conductive traces 656, 658, first and second conductive pads 660, 662, and an insulator material 664 that separates the first and second conductive pads 660, 662. The first and second conductive pads 660, 662 may comprise a conductive material such as silver ink. The first and second conductive pads 660, 662 may be embedded between the insulator material 664. The insulator material 664 may be comprised of Mylar or other non-conductive material. The base 652 may include an adhesive on one side to assist in mounting the liquid level sensor assembly 650 to an outer surface of the blend chamber 40. One of the first and second conductive pads 660, 662 may be connected to DC ground and the other of the first and second conductive pads 660, 662 may be connected to a sensor input of a capacitive sensing PCB that is attached to the controller 22.

The liquid level sensor assembly 650 may be mounted to the blend chamber 40 with the first and second conductive pads 660, 662 arranged vertically. The liquid level sensor assembly 650 may be positioned vertically upward from the bottom wall 56 at a location that provides a content level of about, for example, 8 ounces. In one example, the liquid level sensor assembly 650 is based about ½ inch below the upper edge of the bottom wall 56. The liquid level sensor assembly 650 may be electrically connected to a capacitive sensing microcontroller using, for example, a coaxial-style cable.

Water is typically a conductive material that may be used as a second plate of a capacitor. Typically, the product, water and ice inputs into the blending assembly 12 include water as a primary component. As the contents within the blend chamber 40 approach the liquid level sensor assembly 650, the capacitance of the liquid level sensor assembly 650 changes. This change is monitored by a capacitive sensing microcontroller (e.g., the controller 22 or a separate microcontroller (not shown) positioned in close proximity to the liquid level sensor assembly 650). When the detected capacitance exceeds a threshold (e.g., a level threshold plus a hysteresis value), the capacitive sensing microprocessor may set an internal flag indicating that the desired level has been reached, which activates the controller 22 to shut OFF the input into the blend chamber 40 from the product, water, or ice source 14, 16, 18. The capacitive sensing microprocessor may be separate from other processors included in the controller 22. In at least one example, a separate PCB, microprocessor and software program may be used to interface with the liquid level sensor assembly 50, 650, which in turn communicates with the controller 22.

Figure 8:
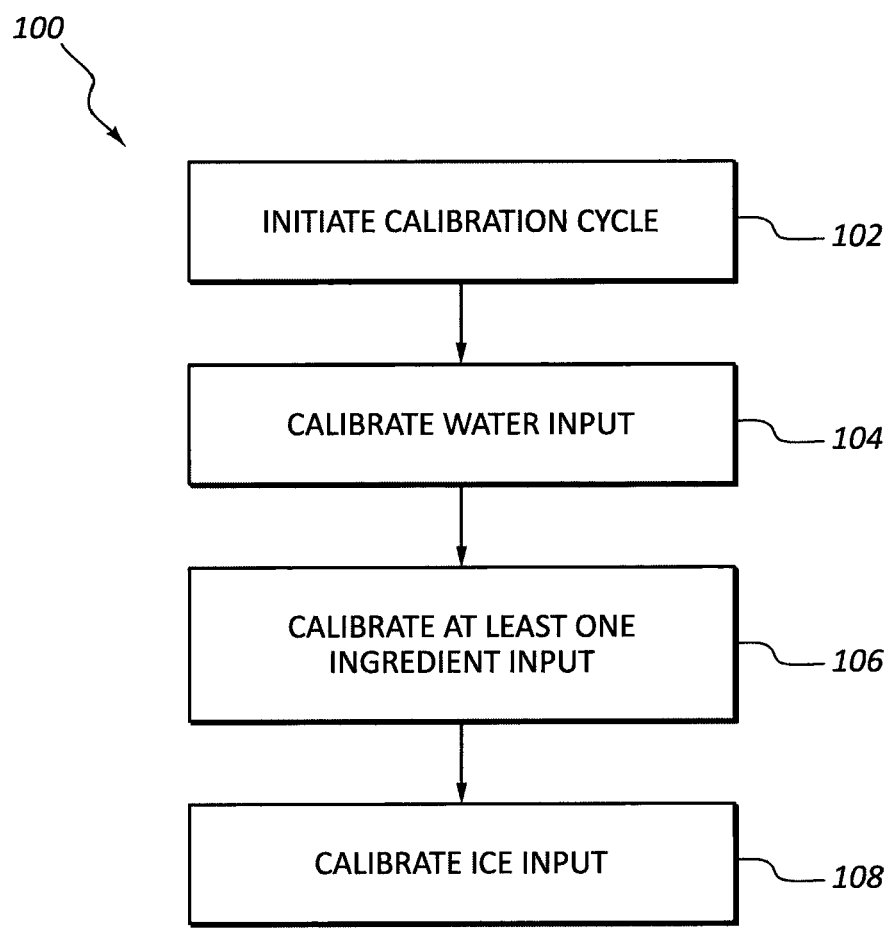
FIG. 8 is a flow diagram illustrating one embodiment of a method of calibrating a self-serve blending machine in accordance with the present disclosure.

Referring now to FIG. 8, an example method 100 of calibrating a self-serve blending machine is represented in a flowchart format. The method 100, and other methods described herein, may be implemented using a calibration module that is part of the controller 22 or operates cooperatively with the controller 22.

The method 100 illustrated in FIG. 8 includes initiation of a calibration cycle in step 102 followed by a step of calibrating water input 104, calibrating at least one product input 106, and calibrating an ice input 108. Example methods of calibrating the water, product and ice inputs are described in further detail with reference to FIGS. 9-11 as methods 200, 300, 400, respectively. Any one of the calibrating steps 104, 106, 108 may be repeated as part of the calibration cycle of the method 100.

Figure 9:
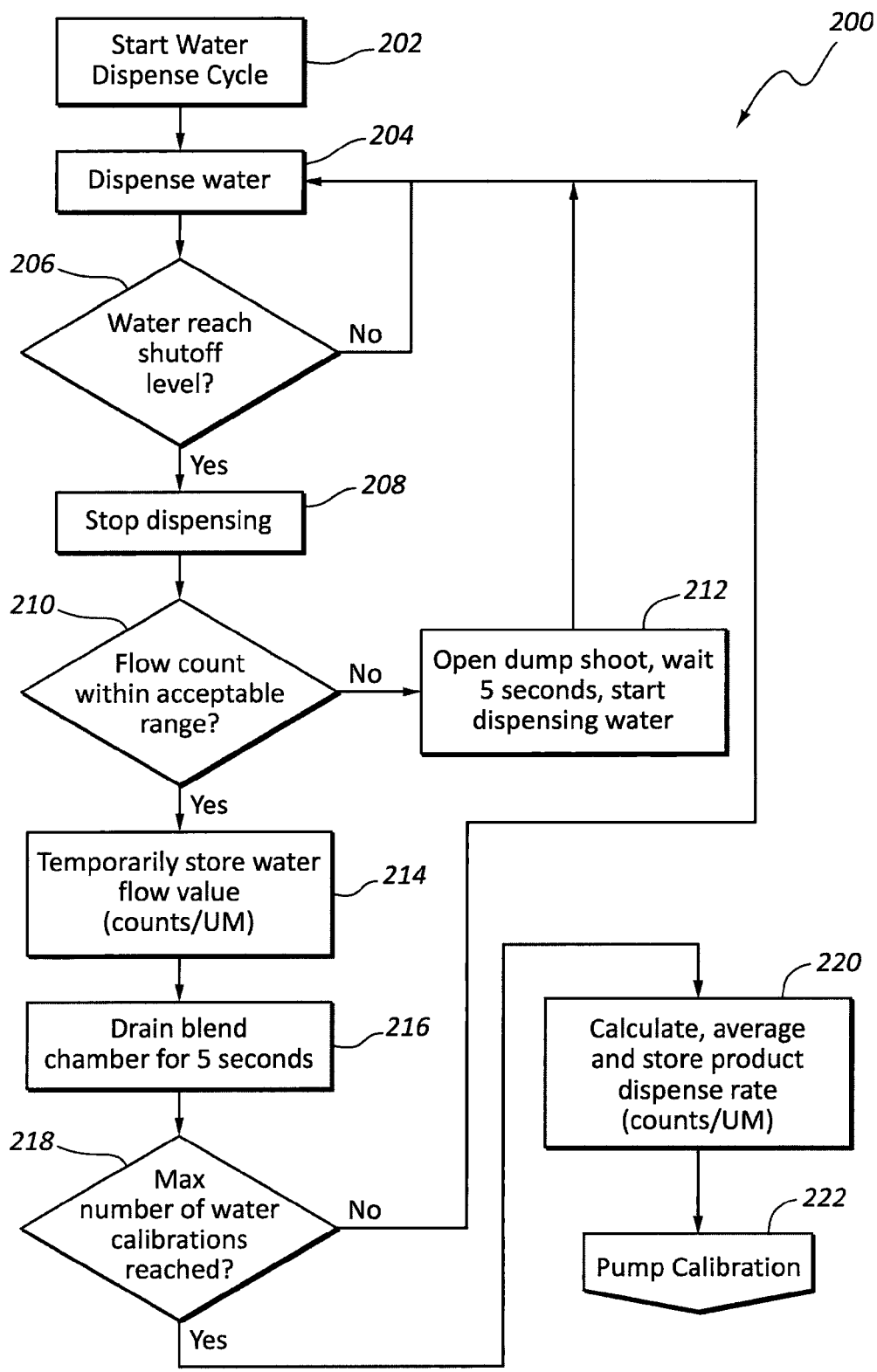
FIG. 9 is a flow diagram illustrating one embodiment of a method of calibrating a water input in accordance with the present disclosure.
Figure 10:
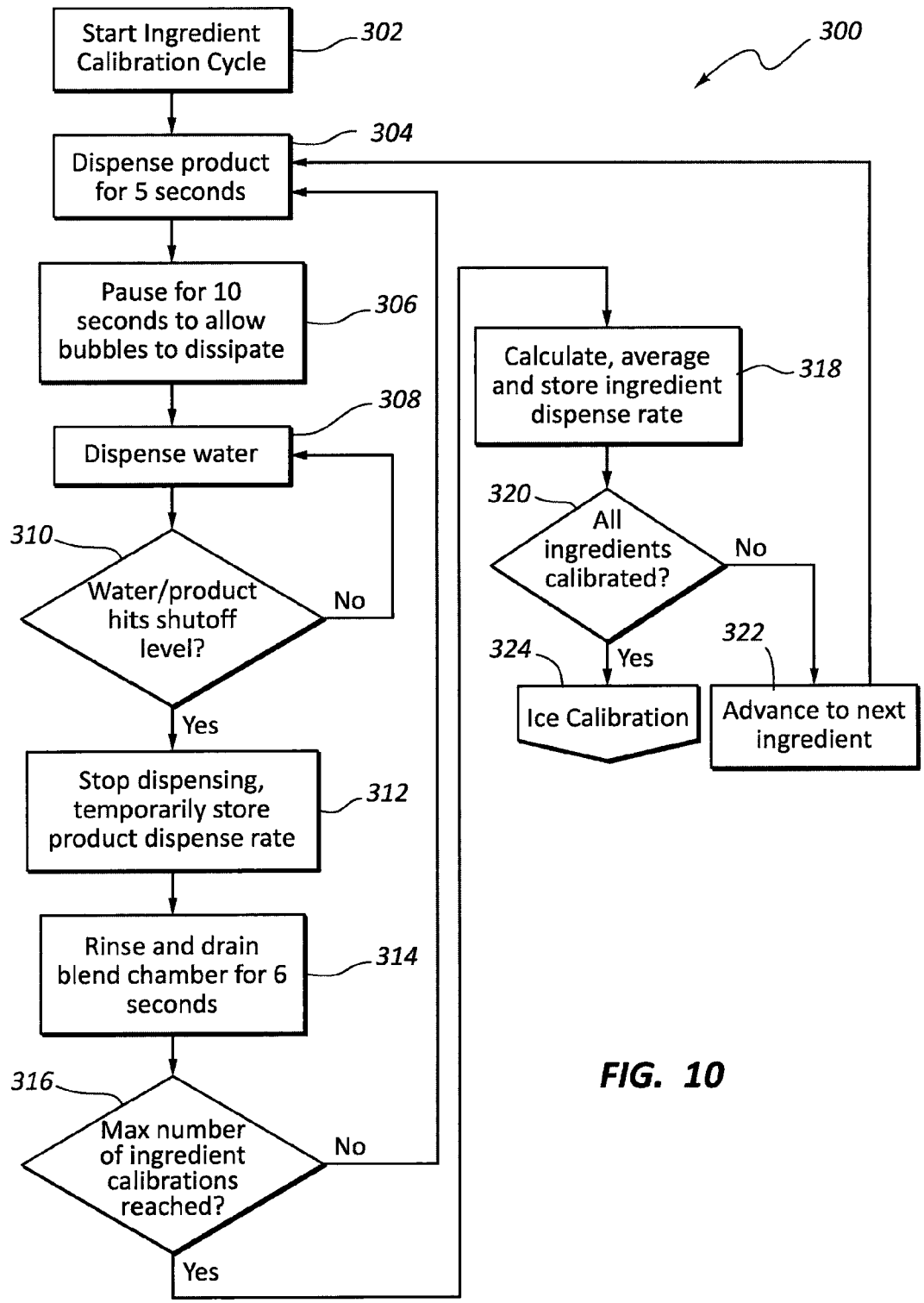
FIG. 10 is a flow diagram illustrating one embodiment of a method of calibrating a product input in accordance with the present disclosure.

Referring now to FIG. 9, a water calibration cycle 200 begins with step 202 of starting the water dispense cycle. Water is dispensed into the blending assembly in step 204. The water level is monitored and water continues to dispense until the water shutoff level is reached in step 206. Once reached, the controller operates to stop dispensing of the water in step 208. A dispense count is determined and checked to confirm whether the dispense count is within an acceptable range in step 210. If the dispense count is not within the acceptable range, the blend chamber 40 is emptied in step 212 and step 204 is again initiated. The step 212 may include not only emptying the blend chamber 40 but also providing a delay.

Once the dispense count is found to be within acceptable range, the dispense count value is temporarily stored as a flow value (flow counts/units of measure (UM)) in an array of ValidFlowValues in step 214. The blend chamber 40 is then drained in step 216. The step 216 may also include a delay of a certain time period such as, for example, a 5 second delay. Typically, multiple calibration cycles are conducted. In step 218, the controller determines whether the maximum number of water calibrations has been reached. In some examples, at least three water calibrations is the maximum number. If the maximum number has not been reached, another cycle is initiated in step 204 of dispensing water into the blend chamber 40. If the maximum number has been reached, the controller averages the flow value and stores the averaged value in step 220 in accordance with Equation 1 below. Following the averaging and storing step 220, the controller may initiate the product calibration cycle of the method 300 show with reference to FIG. 10.

$$WaterFlow_{(avg)} = \frac{\sum_{n=1}^{3} ValidFlowValues(n)}{3} \qquad \text{Equation 1}$$

The product calibration cycle of the method 300 begins with starting a product calibration cycle in step 302 to dispense a product in step 304. Dispensing the product may occur for a predetermined amount of time such as, for example, 5 seconds. In step 306, a pause period may occur to allow the product to settle within the blending assembly. The pause period may be a predetermined time such as, for example, 10 seconds. Water is then dispensed into the blending assembly to mix with the dispensed product in step 308. When a predetermined content level is reached within the blending assembly in step 310, water is stopped being dispensed in step 312. The step 312 may also include additional steps such as, for example, determining an amount of product dispensed according to Equation 2 (see below), determining a dispense rate for the product using the amount of time the product was dispensed and the average flow value for water according to Equation 3 (see below) and is stored in a TempValues array.

$$V_{(p)} = L_{(s)} - \frac{C}{R_{(w)}} \quad \text{Equation 2}$$

Where:
$V_{(p)}$=product volume=
$L_{(s)}$=calibration shutoff level
C=captured water flow count
$R_{(w)}$=the water flow rate (cnts/unit of measure)

$$R_{(p)} = \frac{V_{(p)}}{DispenseTime} \quad \text{Equation 3}$$

$R_{(p)}$=the product dispense rate
$V_{(p)}$=product volume

In step 314, the blending assembly is rinsed and drained for a predetermined amount of time such as, for example, 6 seconds. The controller determines whether a maximum number of product calibration cycles have been reached in step 316. If not, another cycle is initiated with dispensing the product in step 304. If the maximum number has been reached (e.g., two cycles) the dispense rate for the product is averaged in step 318 using Equation 4 below.

$$R_{(p)(avg)} = \frac{\sum_{n=1}^{2} TempValues(n)}{2} \quad \text{Equation 4}$$

Where:
$R_{(p)}$=the product dispense rate
$V_{(p)}$=product volume

Step 218 may further include storing the average product dispense rate. The steps to calibrate the dispense rate for a product may be repeated for each of the two or more products in the self-serve blending machine. In at least one example, the self-serve blending machine may include multiple products that are each calibrated. If further products need to be calibrated, step 322 includes advancing to the next product. Once all of the products are calibrated in step 320, the ice calibration may be initiated in step 324.

Figure 11:
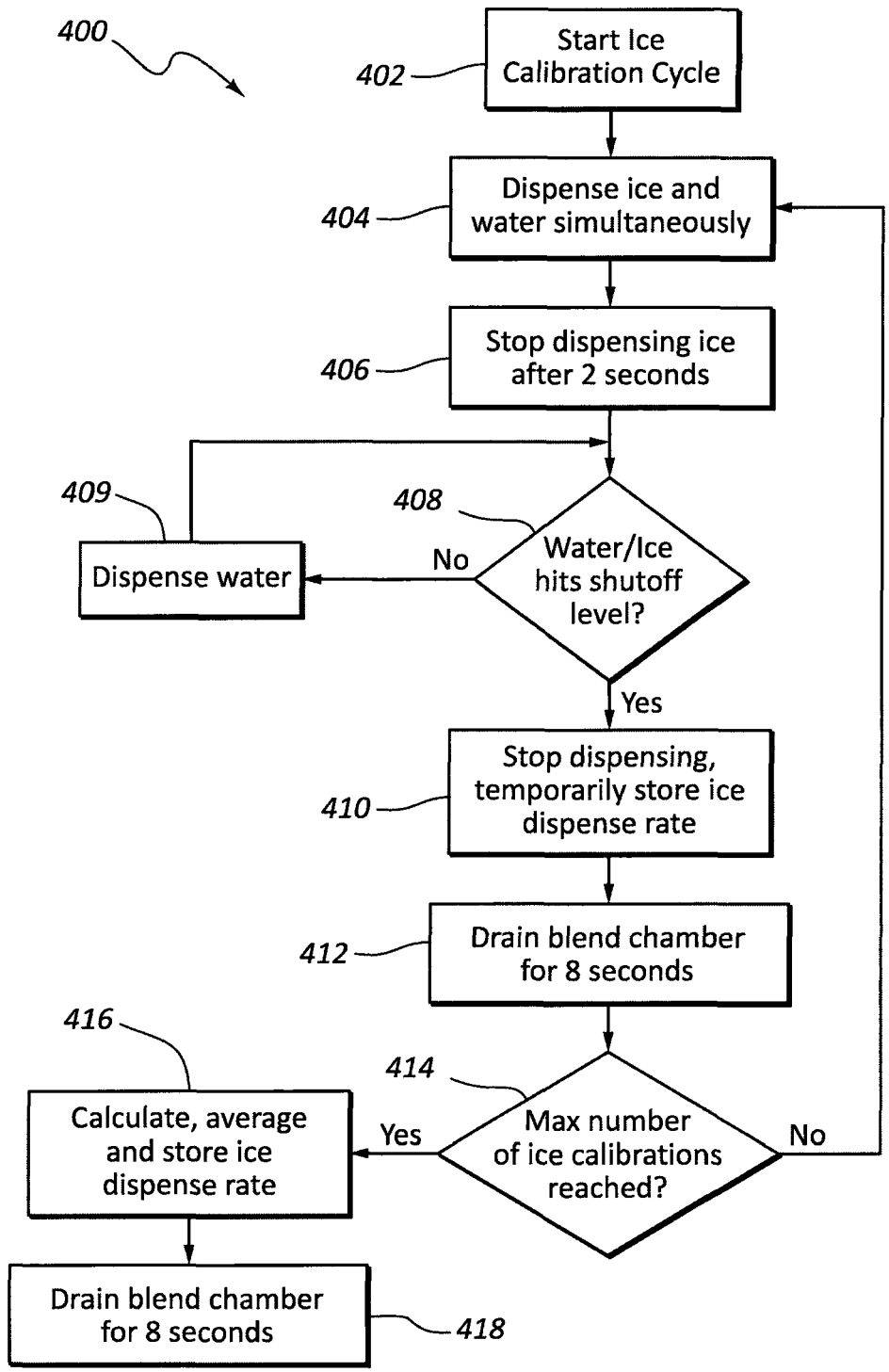
FIG. 11 is a flow diagram illustrating one embodiment of a method of calibrating an ice input in accordance with the present disclosure.

Referring now to FIG. 11, the ice calibration cycle of the method 400 is initiated with starting the cycle in step 402 and dispensing ice and water simultaneously into the blending assembly in step 404. In step 406, the ice is stopped dispensing after a predetermined amount of time (e.g., about 2 seconds). If the content level is not yet reached, water continues to be dispensed into the blending assembly until a content level has been sensed in step 408, the water is stopped dispensing in step 410.

In step 410, a volume of ice is determined using Equation 5 (see below), and Equation 6 (see below) is then used to calculate the ice dispense rate.

$$V_{(i)} = L_{(s)} - \frac{C}{R_{(w)}} \quad \text{Equation 5}$$

Where:
$V_{(i)}$=ice volume
$L_{(s)}$=calibration shutoff level
C=captured water flow count
$R_{(w)}$=the water flow rate (cnts/unit of measure)

$$R_{(i)} = \frac{V_{(i)}}{DispenseTime} \quad \text{Equation 6}$$

Where:
$R_{(i)}$=the ice dispense rate
$V_{(i)}$=ice volume

The blend chamber is then drained for a predetermined amount of time (e.g., about 8 seconds) in step 412. The controller determines whether the maximum number of ice calibration cycles has been reached in the step 414. In one example, the maximum number of ice calibrations cycles is about three cycles. If the maximum number has not been reached, another cycle is initiated in the step 404 of dispensing ice and water. If the maximum number has been reached, Equation 7 (see below) is used in step 416 to determine an average ice dispense rate. The step 416 may further include storing the average ice dispense rate before completion of the calibration cycle in step 418.

$$R_{(i)(avg)} = \frac{\sum_{n=1}^{3} TempValues(n)}{3} \quad \text{Equation 7}$$

In the step 404 above, the ice and water may be dispensed sequentially rather than simultaneously in separate steps. In steps 304, 306 and 308 above, the dispensing of ice and water may be done simultaneously for a period of time before the dispensing of ice is shut OFF similar to the step 404 in the calibration cycle of the method 400.

In one example, the self-serve blending machine may include, for example, a Cypress Semiconductor microprocessor, a rectangular shaped liquid level sensor (see FIG. 13). adhered to the outside wall of the blend chamber 40, and a coaxial-style wire connecting the liquid level sensor to the capacitive sensing microprocessor.

The capacitive sensing microprocessor may also be connected to an intelligent interface controller ($I^2C$) bus for communication with another device. This bus may be connected to, for example, the main control $I^2C$ bus (e.g., the controller 22) and used to transfer data from the capacitive sensing PCB to the controller 22. This data includes, but is not limited to, sending a signal to stop dispensing when a liquid level has reached the liquid level sensor.

An example auto-calibration design may utilize calibrating the water and product flow rates as well as the ice dispense rate. The system may use water displacement to calibrate the product and ice rates. Accordingly, calibrating the water occurs before calibrating the product and ice rates. When activated either by a user or a system calibration timer, the system starts dispensing water into the blend chamber while monitoring the water flow through a flow meter connected to the water line. When the liquid level sensor detects the water, the liquid level sensor sends a signal to the controller 22, which stops dispensing water and calculates a dispense rate (e.g., in counts per ounce). This process may repeat multiple times to ensure accuracy.

The system then begins dispensing product (i.e., liquid ingredient) from a first product source. After a predetermined time, the pump stops and the system begins dispensing water until the product/water mixture reaches the liquid level sensor. At this time, the system stops dispensing water and calculates the product dispense rate (e.g., in ounces per second) based on the amount of water that has been added to the product. This process continues through all of the product sources.

The system then dispenses ice into the blending assembly for a predetermined time followed by, or coincidentally with, dispensing water. When the liquid level sensor detects the liquid, the system stops dispensing water and calculates an ice dispense rate (e.g., in ounces per second). This process may repeat multiple times.

Figure 12:
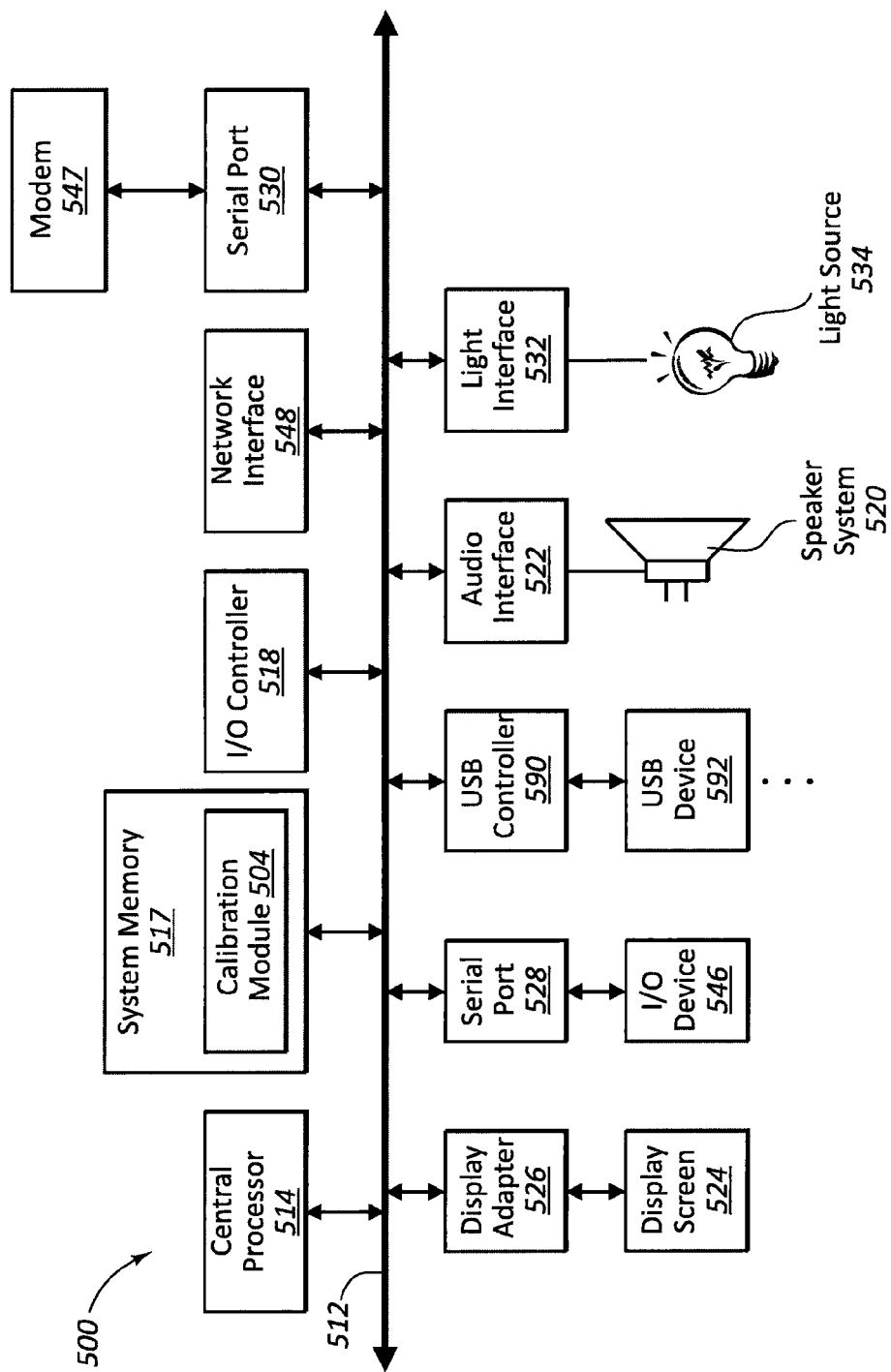
FIG. 12 is a block diagram depicting a computer system suitable for implementing the present systems and methods.

FIG. 12 depicts a block diagram of a computer system 500 suitable for implementing the present systems and methods. Computer system 500 includes a bus 512 which interconnects major subsystems of computer system 500, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, a serial port 528 (interfaced with any I/O device 546), an external light device, such as a light source 534 via a light interface 532, and multiple USB devices 592 (interfaced with a USB controller 590). Also included are a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. For example, a calibration module 504 to implement the present systems and methods may be stored within the system memory 517. Applications resident with computer system 500 are generally stored on and accessed via a computer readable medium, such as a hard disk drive, an optical drive, a floppy disk drive, or other storage medium. Additionally, applications may be in the form of electronic signals modulated in accordance with the application and data communication technology when accessed via modem 547 or network interface 548.

The storage interfaces of computer system 500 may connect to a standard computer readable medium for storage and/or retrieval of information. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner. Conversely, all of the devices shown in FIG. 12 need not be present to practice the present systems and methods. The devices and subsystems may be interconnected in different ways from that shown in FIG. 12. The operation of a computer system such as that shown in FIG. 12 is readily known in the art and is not discussed in detail in this application. Code to implement the present disclosure may be stored in computer-readable medium such as system memory 517. The operating system provided on computer system 500 may be MS-DOS®, MS-WINDOWS®, OS/2®, UNIX®, Linux®, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the spirit of the invention. The words "including" and "having," as used in the specification, including the claims, shall have the same meaning as the word "comprising."

We claim:

1. A self-serve drink blending device, comprising:
a blend chamber comprising a blending blade;
at least one product source configured to deliver a volume of product to the blend chamber;
a water source configured to deliver a volume of water to the blend chamber;
an ice source configured to deliver a volume of ice to the blend chamber;
a liquid level sensor mounted to the blend chamber and configured to create a liquid level signal when contents in the blend chamber reach a predetermined level;
a controller configured to automatically calibrate the at least one product source, the water source, and the ice source based on the liquid level signal;
a dispenser arranged to dispense contents from the blend chamber.

2. The self-serve drink blending device of claim 1, wherein the liquid level sensor comprises a capacitive sensor.

3. The self-serve drink blending device of claim 1, wherein the liquid level sensor is mounted to an exterior surface of the blend chamber.

4. The self-serve drink blending device of claim 2, wherein the capacitive sensor comprises a pad having at least two conductive traces separated by an insulator.

5. The self-serve drink blending device of claim 1, wherein the liquid level sensor comprises first and second metallic probes exposed within the blend chamber.

6. The self-serve drink blending device of claim 1, wherein the at least one product source includes a plurality of different product sources each configured to deliver a volume of product into the blend chamber.

7. The self-serve drink blending device of claim 1, wherein the ice source comprises an ice making device and an ice metering device.

8. The self-serve drink blending device of claim 1, wherein each of the at least one product source comprises a pump, and the water source comprises a valve or a pump, wherein the controller is configured to turn OFF the pump or valve of the water source in response to the liquid level signal.

\* \* \* \* \*